US009854100B2

(12) United States Patent
Dong et al.

(10) Patent No.: US 9,854,100 B2
(45) Date of Patent: Dec. 26, 2017

(54) METHOD AND DEVICE FOR CALL FORWARDING

(71) Applicant: ZTE Corporation, Shenzhen (CN)

(72) Inventors: Shufang Dong, Shenzhen (CN); Gonghong Xiang, Shenzhen (CN)

(73) Assignee: XI'AN ZHONGXING NEW SOFTWARE CO. LTD, Xi'an (CN)

( * ) Notice: Subject to any disclaimer, the term of this patent is extended or adjusted under 35 U.S.C. 154(b) by 0 days.

(21) Appl. No.: 15/102,923

(22) PCT Filed: May 27, 2014

(86) PCT No.: PCT/CN2014/078565
§ 371 (c)(1),
(2) Date: Aug. 18, 2016

(87) PCT Pub. No.: WO2014/180399
PCT Pub. Date: Nov. 13, 2014

(65) Prior Publication Data
US 2016/0352909 A1    Dec. 1, 2016

(30) Foreign Application Priority Data

Dec. 13, 2013  (CN) .......................... 2013 1 0689159

(51) Int. Cl.
*H04M 3/42*    (2006.01)
*H04M 3/54*    (2006.01)
*H04W 4/16*    (2009.01)

(52) U.S. Cl.
CPC .............. *H04M 3/54* (2013.01); *H04W 4/16* (2013.01)

(58) Field of Classification Search
CPC ............. H04M 3/436; H04M 3/42229; H04M 3/42161; H04M 3/54; H04M 3/42059; H04M 3/42153; H04M 3/42068; H04M 3/42102; H04M 3/4365; H04M 2203/158; H04M 3/02; H04M 7/0075; H04L 65/1069; H04L 45/306
See application file for complete search history.

(56) References Cited

U.S. PATENT DOCUMENTS

2004/0258233 A1 * 12/2004 Poustchi ............... H04M 1/006
                                                        379/211.02
2009/0086947 A1 *  4/2009 Vendrow ................ H04M 3/02
                                                        379/201.12
(Continued)

FOREIGN PATENT DOCUMENTS

CN          1848884 A      10/2006
CN          1859508         11/2006
(Continued)

OTHER PUBLICATIONS

International Search Report for corresponding application PCT/CN2014/078565 filed on May 27, 2014; dated Sep. 11, 2014.

*Primary Examiner* — Kwasi Karikari
(74) *Attorney, Agent, or Firm* — Cantor Colburn LLP

(57) ABSTRACT

The disclosure relates to a method and device for call forwarding. The method comprises: receiving a calling number of an incoming call; forwarding or holding the calling number according to a preset multi-call forwarding rule. The disclosure increases the call forwarding flexibility of mobile terminals such as mobile phone, and provides convenience to users.

11 Claims, 7 Drawing Sheets

(56) References Cited

U.S. PATENT DOCUMENTS

2011/0293084 A1* 12/2011 Bhagavatula ....... H04L 41/5067
                                                                  379/211.02
2014/0045473 A1*  2/2014 Salisbury ................ H04W 4/16
                                                                     455/417

FOREIGN PATENT DOCUMENTS

| CN | 101217774 A | 7/2008 |
| CN | 102918823 A | 2/2013 |

\* cited by examiner

METHOD AND DEVICE FOR CALL FORWARDING

TECHNICAL FIELD

The disclosure relates to the communications field, and in particular to a method and device for call forwarding.

BACKGROUND

At present, a call forwarding function of mobile phones is relatively simple. Generally, an incoming call is forwarded to a preset number depending on a state of a mobile phone of a user only, without distinguishing calling objects; therefore, it is impossible to specify a forwarding scheme for multiple calling objects of the mobile phone respectively; thus, a call forwarding flexibility of mobile phones is reduced.

SUMMARY

The embodiments of the disclosure provide a method and device for call forwarding, aiming at improving a call forwarding flexibility of mobile terminals.

One embodiment of the disclosure provides a method for call forwarding, including:

receiving a calling number of an incoming call; forwarding or holding the calling number according to a preset multi-call forwarding rule.

In an example embodiment, forwarding or holding the calling number according to the preset multi-call forwarding rule includes: analyzing the calling number and judging whether the calling number matches with any preset multi-call forwarding number; when the calling number matches with the preset multi-call forwarding number, forwarding the calling number to the matched multi-call forwarding number.

In an example embodiment, before forwarding the calling number to the matched multi-call forwarding number, the method further includes: judging whether a call duration reaches a preset threshold; when the call duration reaches the preset threshold, executing a step of forwarding the calling number to the matched multi-call forwarding number.

In an example embodiment, before analyzing the calling number, the method further includes: judging whether a time point, at which the incoming call from the calling number is received, is in a preset multi-call forwarding time range; when the time point is in the preset multi-call forwarding time range, executing the step of analyzing the calling number; when the time point is not in the preset multi-call forwarding time range, holding the calling number and entering a normal call process.

In an example embodiment, after judging whether the calling number matches with the preset multi-call forwarding number, the method further includes: when the calling number does not match with any preset multi-call forwarding number, forwarding the calling number to a default multi-call forwarding number when a call duration reaches a preset threshold.

In an example embodiment, after judging whether the calling number matches with the preset multi-call forwarding number, the method further includes: when the calling number does not match with any preset multi-call forwarding number, holding the calling number and entering a normal call process.

In an example embodiment, after receiving the calling number of the incoming call, the method further includes: judging whether a multi-call forwarding function is enabled; when the multi-call forwarding function is enabled, executing a step of forwarding or holding the calling number according to the preset multi-call forwarding rule; when the multi-call forwarding function is not enabled, holding the calling number and entering a normal call process.

In an example embodiment, the method further includes: disabling the multi-call forwarding function.

In an example embodiment, before receiving the calling number of the incoming call, the method further includes: setting a multi-call forwarding number for specified and/or non-specified contacts.

Another embodiment of the disclosure also provides a device for call forwarding, including:

a receiving component, which is configured to receive a calling number of an incoming call; a call forwarding component, which is configured to forward or reserve the calling number according to a preset multi-call forwarding rule.

In an example embodiment, the call forwarding component is configured to analyze the calling number and to judge whether the calling number matches with any preset multi-call forwarding number, and, when the calling number matches with the preset multi-call forwarding number, to forward the calling number to the matched multi-call forwarding number.

In an example embodiment, the call forwarding component is further configured to judge whether a call duration reaches a preset threshold, and, when the call duration reaches the preset threshold, to forward the calling number to the matched multi-call forwarding number.

In an example embodiment, the call forwarding component is further configured to: judge whether a time point, at which the incoming call from the calling number is received, is in a preset multi-call forwarding time range; when the time point is in the preset multi-call forwarding time range, analyze the calling number; when the time point is not in the preset multi-call forwarding time range, reserve the calling number to enter a normal call process.

In an example embodiment, the call forwarding component is further configured to: when the calling number does not match with the preset multi-call forwarding number, forward the calling number to a default multi-call forwarding number when a call duration reaches a preset threshold, or, when the calling number does not match with the preset multi-call forwarding number, reserve the calling number to enter a normal call process.

In an example embodiment, the device further includes: a judgment component, which is configured to judge whether a multi-call forwarding function is enabled; wherein when the multi-call forwarding function is enabled, the call forwarding component is configured to forward or reserve the calling number according to the preset multi-call forwarding rule; when the multi-call forwarding function is not enabled, the call forwarding component is configured to reserve the calling number to enter a normal call process.

In an example embodiment, the judgment component is further configured to disable the multi-call forwarding function.

In an example embodiment, the device further includes: a setting component, which is configured to set a multi-call forwarding number for specified and/or non-specified contacts.

The embodiments of the disclosure provide a method and device for call forwarding, which can provide a call forwarding service for a specified calling object; specifically, through matching with any preset multi-call forwarding number, multi calls originally sent to a mobile phone number of a user are forwarded to a corresponding specified number or are reserved. This scheme can set for all types of calling objects whether it is needed to perform call forwarding and set the call forwarding direction, for example, once a call forwarding number is set for a user A on a contact list successfully, then the call from the user A can be forwarded to the specified number; this scheme improves the call forwarding flexibility of mobile terminals such as mobile phone and provides convenience to users.

The technical scheme of the embodiments of the disclosure will become more clearly understood from the detailed description below taken in conjunction with accompanying drawings.

DETAILED DESCRIPTION

It should be understood that specific embodiments described below are only to illustrate the disclosure but not to limit the disclosure.

A solution of the embodiments of the disclosure mainly is: receiving a calling number of an incoming call; call forwarding or holding the calling number according to a preset multi-call forwarding rule. Specifically, through matching the calling number with any preset multi-call forwarding number, multi calls originally sent to a mobile phone number of a user are forwarded to a corresponding specified number or are reserved. This scheme can set for all types of calling objects whether it is needed to perform call forwarding and set the call forwarding direction, so as to improve the call forwarding flexibility of mobile terminals such as mobile phone and provide convenience to users.

Figure 1:
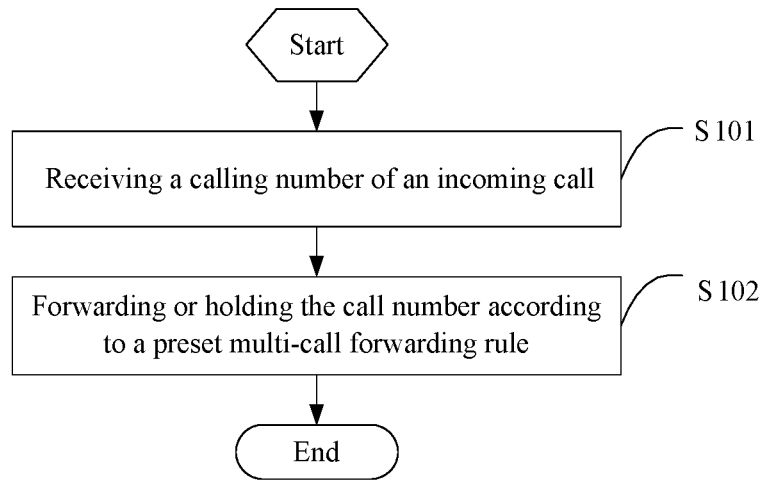
FIG. 1 is a flowchart of a method for call forwarding according to a first embodiment of the disclosure.

As shown in FIG. 1, an embodiment of the disclosure provides a method for call forwarding, including:

S101: receiving a calling number of an incoming call.

Terminals involved in the method of this embodiment can be mobile terminals with call functions. The embodiment of the disclosure takes a mobile phone as an example.

This scheme does not depend on a support of operators such as Mobile Communications or Telecommunications, and it can dynamically or randomly set a mobile phone number to receive the multi-call forwarding, so as to complete the multi-call forwarding function of calls sent to one mobile phone.

S102: call forwarding or holding the calling number according to a preset multi-call forwarding rule.

When a mobile phone receives the calling number of the incoming call, the mobile phone forwards or reserves the calling number according to the preset multi-call forwarding rule.

The multi-call forwarding rule can be set according to a requirement and selection of a user, for example, a user can set a time period of the call forwarding according to requirements, that is to say, the user can set in advance to perform call forwarding for incoming calling numbers in a specified time period. For example, during vacation, to avoid being interrupted by working phones, the user can forward a specified incoming calling number to a specified call forwarding number.

For another example, the user can select part contacts or calling objects to be forwarded.

When setting the specified call forwarding number, the user can respectively specify a corresponding call forwarding number for a contact on a mobile phone contact list, or can specify a corresponding call forwarding number for all calling objects.

Through the above scheme, this embodiment provides a call forwarding service for a specified calling object. Specifically, through matching with the preset multi-call forwarding number, multiple calls originally sent to a mobile phone number of a user are forwarded to the corresponding specified number or are reserved. This scheme can set for all types of calling objects whether it is needed to perform call forwarding and set the call forwarding direction, so as to improve the call forwarding flexibility of mobile terminals such as mobile phone and provide convenience to users.

Figure 2:
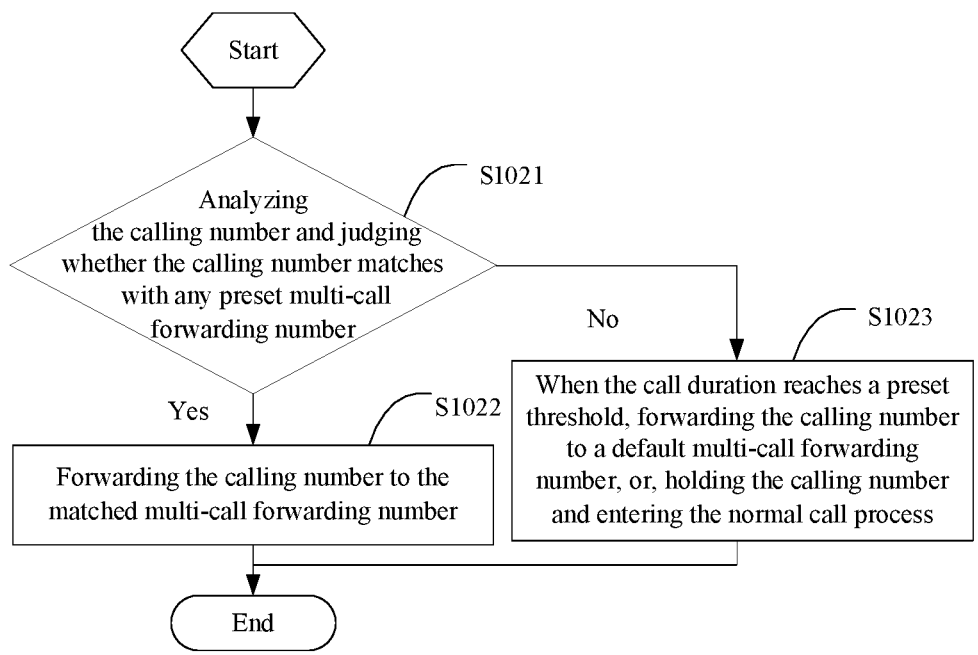
FIG. 2 is a flowchart of forwarding or holding a calling number based on a preset multi-call forwarding rule according to a first embodiment of the disclosure.

More specifically, as shown in FIG. 2, as an implementation, forwarding or holding the calling number according to the preset multi-call forwarding rule in S102 might include:

S1021: analyzing the calling number and judging whether the calling number matches with the preset multi-call forwarding number; if the calling number matches with the preset multi-call forwarding number, entering S1022; otherwise, entering S1023.

S1022: forwarding the calling number to the matched multi-call forwarding number.

S1023: when a call duration reaches a preset threshold, forwarding the calling number to a default multi-call forwarding number, or, holding the calling number and entering the normal call process.

Specifically, when the calling number of the incoming call is received, this calling number is analyzed to judge whether this calling number matches with the preset multi-call forwarding number; if this calling number matches with the preset multi-call forwarding number, this calling number is forwarded to the matched multi-call forwarding number.

If the calling number does not match with the preset multi-call forwarding number, the following two schemes can be adopted.

The first scheme: when the call duration reaches the preset threshold, forwarding the calling number to the default multi-call forwarding number.

In this application scene, if the calling number does not match with the preset multi-call forwarding number, the calling number might not be forwarded and the user can answer the call; if the user does not answer the incoming call after certain time, the calling number can be forwarded to the default multi-call forwarding number which is set by the user in advance.

The second scheme: if the calling number does not match with the preset multi-call forwarding number, never forwarding it, but holding the calling number and entering the normal call process.

Figure 3:
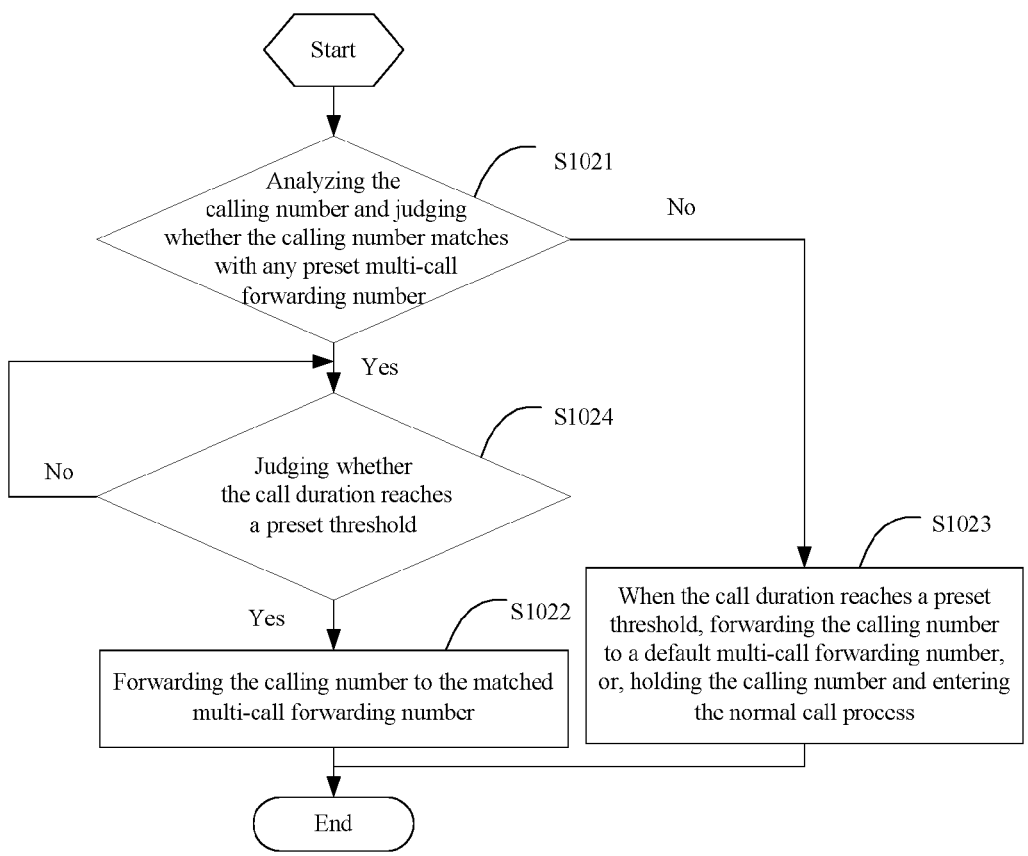
FIG. 3 is a flowchart of forwarding or holding a calling number based on a preset multi-call forwarding rule according to a second embodiment of the disclosure.

Through the above scheme, this embodiment provides the call forwarding service for a specified calling object. Through matching with any preset multi-call forwarding number, this embodiment improves the call forwarding flexibility of mobile terminals such as mobile phone and provides convenience to users As shown in FIG. 3, as another implementation, on the basis of the implementation shown in FIG. 2, before S1022 the method might further include:

S1024: judging whether the call duration reaches the preset threshold; if the call duration reaches the preset threshold, entering S1022; if the call duration does not reach the preset threshold, returning to S1021.

Different from the implementation shown in FIG. 2, if the calling number matches with the preset multi-call forwarding number, this implementation does not directly forward the calling number to the matched multi-call forwarding number, but judges whether the call duration reaches the preset threshold; if the call duration reaches the preset threshold, the calling number is forwarded to the multi-call forwarding number. In this scheme, the user can answer the call according to requirements, also can select to forward the call; in this way, this implementation can improve the flexibility of the user answering the call, prevent the user from missing any call, meet different requirements of the user and improve the flexibility of call forwarding.

Figure 4:
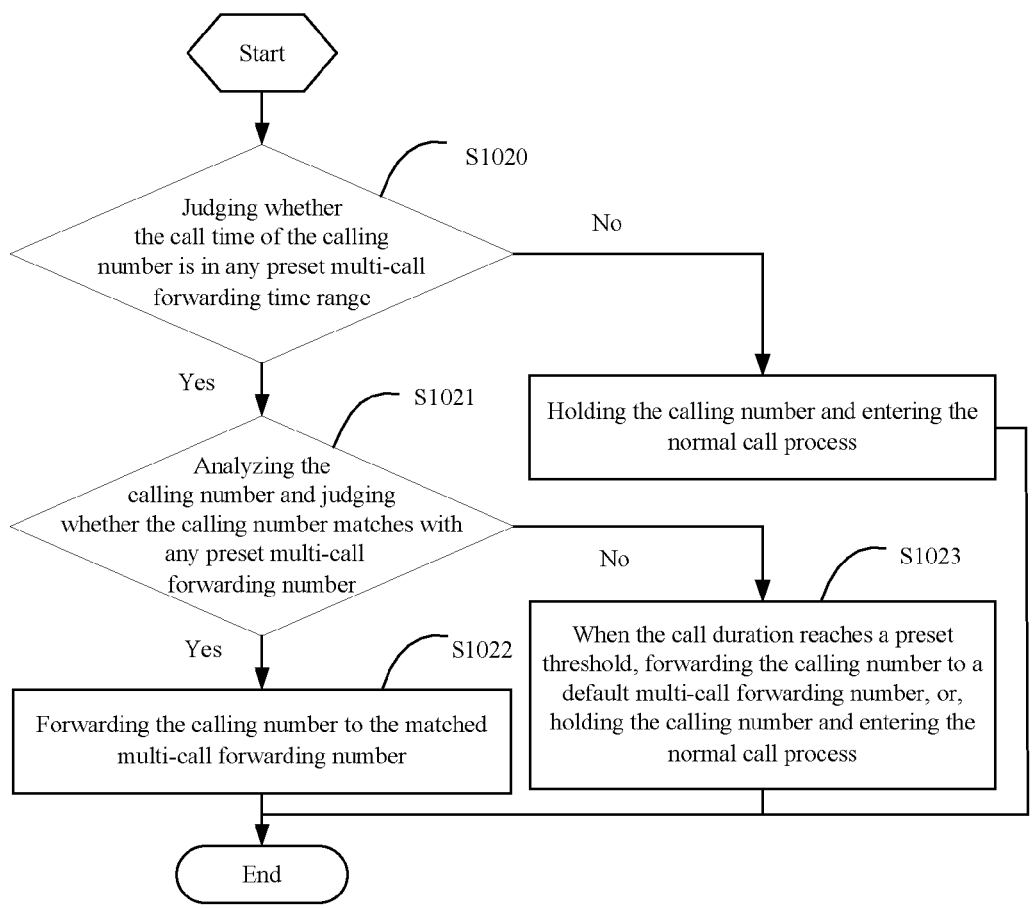
FIG. 4 is a flowchart of forwarding or holding a calling number based on a preset multi-call forwarding rule according to a third embodiment of the disclosure.

As shown in FIG. 4, as a third implementation, on the basis of the implementation shown in FIG. 2, before S1021 the method might further include:

S1020: judging whether a time point, at which the incoming call from the calling number is received, is in a preset multi-call forwarding time range; if the time point is in the preset multi-call forwarding time range, executing S1021; if the time point is not in the preset multi-call forwarding time range, entering S1025.

S1025: holding the calling number and entering the normal call process.

Different from the implementation shown in FIG. 2, after the calling number is received, this implementation does not directly perform call forwarding, but judges whether to perform call forwarding, that is, judging whether a time point, at which the incoming call from the calling number is received, is in the preset multi-call forwarding time range; if the time point is in the preset multi-call forwarding time range, analyzing the calling number, forwarding the call or holding the call; if the time point is not in the preset multi-call forwarding time range, holding the calling number and entering the normal call process.

In this implementation, the user can set in advance to perform call forwarding for incoming calling numbers in a specified time period; for example, during vacation, to avoid being interrupted by working phones, the user can forward a specified incoming calling number to a specified call forwarding number. The user also can select part contacts or calling objects to be forwarded.

Through the above scheme, this implementation can improve the flexibility of the user answering the call, meet different requirements of the user and meanwhile improve the flexibility of call forwarding.

Figure 5:
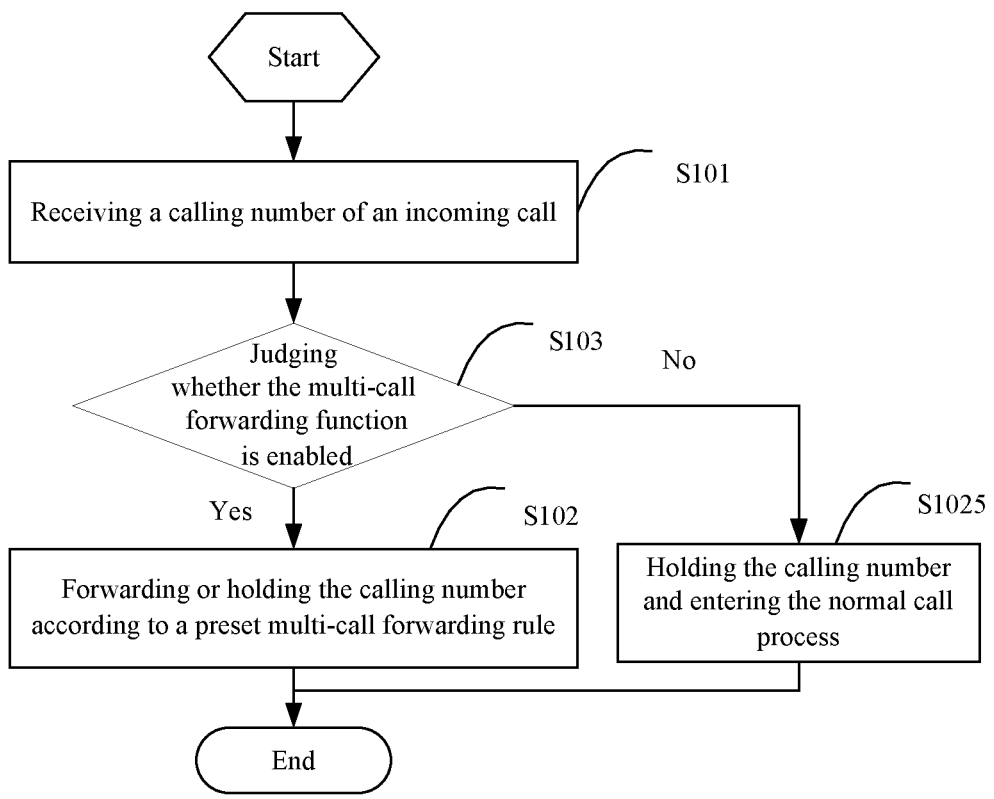
FIG. 5 is a flowchart of a method for call forwarding according to a second embodiment of the disclosure.

As shown in FIG. 5, another embodiment of the disclosure provides a method for call forwarding; on the basis of the embodiment shown in FIG. 1, after S101 the method might further include:

S103: judging whether the multi-call forwarding function is enabled; if the multi-call forwarding function is enabled, executing S102; if the multi-call forwarding function is not enabled, entering S1025.

S1025: holding the calling number and entering the normal call process.

Different from the embodiment shown in FIG. 1, this embodiment further includes judging whether the multi-call forwarding function is enabled after the incoming calling number is received.

A user can select to enable or disable the multi-call forwarding function according to requirements.

After a calling number of an incoming call is received, the mobile phone first judge whether the multi-call forwarding function is enabled; if the multi-call forwarding function is enabled, the mobile phone forwards or reserves the calling number according to a preset multi-call forwarding rule; if the multi-call forwarding function is not enabled, the mobile phone reserves the calling number and enters the normal call process, that is, when the multi-call forwarding function is disabled, all received calls are not forwarded.

Once the multi-call forwarding function is enabled, multi-call information is started to be monitored; once the calling number is monitored to match with the preset number or a preset rule, and the time period is totally matched, a multi-call forwarding mark is set and the calling number is forwarded; when the multi-call forwarding function is disabled, monitoring is stopped.

Through the above scheme, this embodiment can improve the flexibility of the user answering the call, meet different requirements of the user and meanwhile improve the flexibility of call forwarding.

Figure 6:
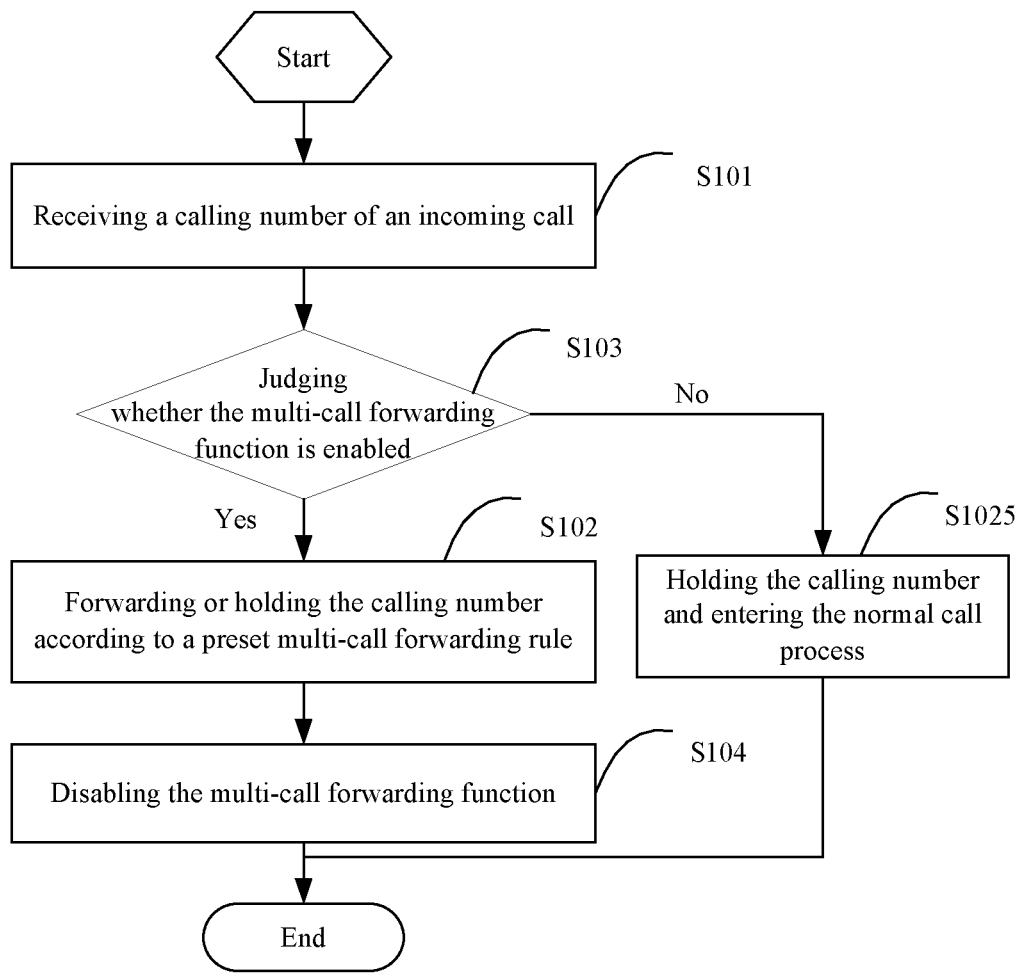
FIG. 6 is a flowchart of a method for call forwarding according to a third embodiment of the disclosure.

As shown in FIG. 6, a third embodiment of the disclosure provides a method for call forwarding; on the basis of the embodiment shown in FIG. 5, after S102 the method further includes:

S104: disabling the multi-call forwarding function.

Different from the embodiment shown in FIG. 5, this embodiment further includes a scheme of disabling the multi-call forwarding function.

A user can disable the multi-call forwarding function when not using the call forwarding function (for example, after vacation) according to actual conditions, thus convenience is brought to the user.

Figure 7:
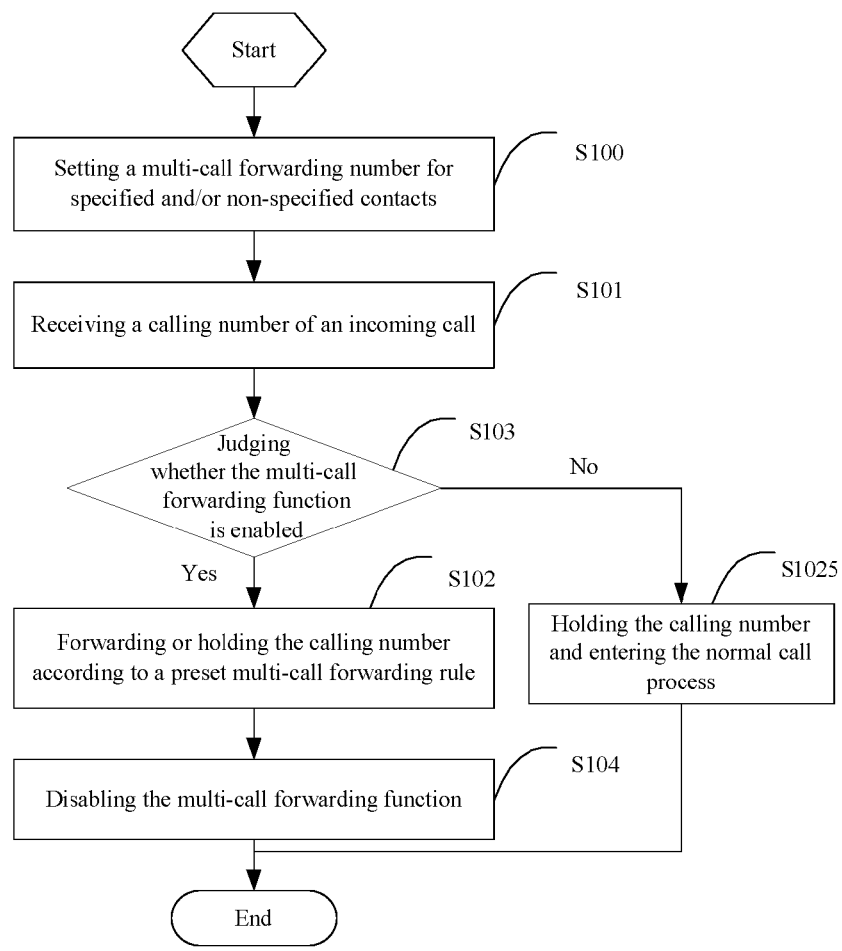
FIG. 7 is a flowchart of a method for call forwarding according to a fourth embodiment of the disclosure.

As shown in FIG. 7, a fourth embodiment of the disclosure provides a method for call forwarding; on the basis of the embodiment shown in FIG. 6, before S101 the method further includes:

S100: setting a multi-call forwarding number for specified and/or non-specified contacts.

Different from the embodiment shown in FIG. 6, this embodiment further includes a scheme of setting a multi-call forwarding number for calling objects When setting a multi-call forwarding number, a user can respectively specify a corresponding call forwarding number for a contact on a mobile phone contact list, or can specify a corresponding call forwarding number for all calling objects. That is to say, the user can set a forwarding function for particular contacts or can set a forwarding function for non-particular contacts, thus the flexibility of the multi-call forwarding number is improved.

Compared with the related art, the embodiment of the disclosure needs no support of operators, and it can implement the multi-call forwarding function with a mobile phone only; all received calls can be forwarded; in addition, an object number to be forwarded can be set in advance, with authentic effect and high flexibility; moreover, a time period needing to be forwarded can be set in advance, with more convenient and reasonable functions.

A feasible call forwarding scheme is illustrated below in detail with specific embodiments.

1. Setting a current call forwarding state as no call forwarding.
2. When receiving an incoming call, judging whether it is needed to be forwarded; if it is needed to be forwarded, going to Step 3; if it is not needed to be forwarded, going to Step 7.
3. Setting a no reply state of a mobile phone as: a call forwarding number is a specified number.
4. Setting the incoming call to a background and stopping ringing.
5. Waiting a period of time, for example, 1 minute, waiting the call to be forwarded to the specified number.
6. Resetting the current call forwarding state as no call forwarding.
7. Entering the normal call process.

Through the above scheme, this embodiment provides a call forwarding service for a specified calling object. Specifically, through matching with any preset multi-call forwarding number, multiple calls originally sent to a mobile phone number of a user are forwarded to a corresponding specified number or are reserved. This scheme can set for all types of calling objects whether it is needed to perform call forwarding and set the call forwarding direction, for example, once a call forwarding number is set for a user A on a contact list successfully, then the call from the user A can be forwarded to the specified number; this scheme improves the call forwarding flexibility of mobile terminals such as mobile phone and provides convenience to users.

Figure 8:
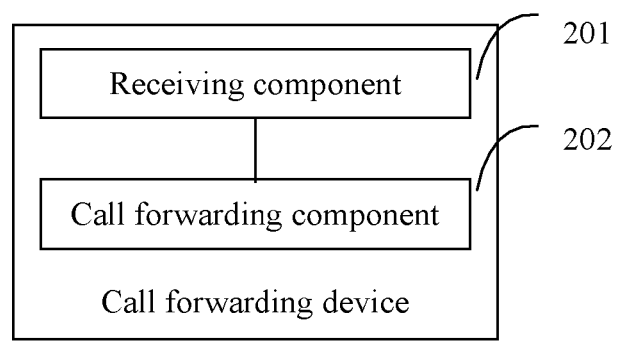
FIG. 8 is a structural schematic diagram of a device for call forwarding according to a first embodiment of the disclosure.

As shown in FIG. 8, an embodiment of the disclosure provides a device for call forwarding, which includes: a receiving component 201 and a call forwarding component 202, wherein the receiving component 201 is configured to receive a calling number of an incoming call;

the call forwarding component 202 is configured to forward or reserve the calling number according to a preset multi-call forwarding rule.

The device of this embodiment can be set in a mobile terminal with a call function such as mobile phone. The embodiment of the disclosure takes a mobile phone as an example.

This scheme does not depend on the support of operators such as Mobile Communications or Telecommunications, and it can dynamically or randomly set a mobile phone number to receive the multi-call forwarding, so as to complete the multi-call forwarding function of calls sent to one mobile phone.

When a mobile phone receives the calling number of the incoming call, the mobile phone forwards or reserves the calling number according to the preset multi-call forwarding rule.

The multi-call forwarding rule can be set according to a requirement and selection of a user, for example, the user can set a time period of call forwarding according to requirements, that is to say, the user can set in advance to perform call forwarding for incoming calling numbers in a specified time period, for example, during vacation, to avoid being interrupted by working phones, the user can forward a specified incoming calling number to a specified call forwarding number.

For another example, the user can select part contacts or calling objects to be forwarded.

When setting the specified call forwarding number, the user can respectively specify a corresponding call forwarding number for a contact on a mobile phone contact list, or can specify a corresponding call forwarding number for all calling objects.

Through the above scheme, this embodiment provides a call forwarding service for a specified calling object. Specifically, through matching with any preset multi-call forwarding number, multiple calls originally sent to a mobile phone number of a user are forwarded to the corresponding specified number or are reserved. This scheme can set for all types of calling objects whether it is needed to perform call forwarding and set the call forwarding direction, so as to improve the call forwarding flexibility of mobile terminals such as mobile phone and provide convenience to users.

More specifically, as an implementation, the call forwarding component 202 is further configured to analyze the calling number and to judge whether the calling number matches with any preset multi-call forwarding number, and, if the calling number matches with the preset multi-call forwarding number, to forward the calling number to the matched multi-call forwarding number.

The call forwarding component 202 is further configured to: if the calling number does not match with the preset multi-call forwarding number, forward the calling number to a default multi-call forwarding number when the call duration reaches a preset threshold, or, if the calling number does not match with the preset multi-call forwarding number, reserve the calling number and enter the normal call process.

Specifically, when the calling number of the incoming call is received, this calling number is analyzed to judge whether this calling number matches with the preset multi-call forwarding number; if this calling number matches with the preset multi-call forwarding number, this calling number is forwarded to the matched multi-call forwarding number.

If the calling number does not match with the preset multi-call forwarding number, the following two schemes can be adopted.

The first scheme: when the call duration reaches the preset threshold, forwarding the calling number to the default multi-call forwarding number.

In this application scene, if the calling number does not match with the preset multi-call forwarding number, the calling number might not be forwarded and the user can answer the call; if the user does not answer the incoming call after certain time, the calling number can be forwarded to the default multi-call forwarding number which is set by the user in advance.

The second scheme: if the calling number does not match with the preset multi-call forwarding number, never forwarding it, but holding the calling number and entering the normal call process.

Through the above scheme, this embodiment provides a call forwarding service for a specified calling object. Through matching with the preset multi-call forwarding number, this embodiment improves the call forwarding flexibility of mobile terminals such as mobile phone and provides convenience to users.

As another implementation, the call forwarding component 202 is further configured to judge whether the call duration reaches a preset threshold, and, if the call duration reaches the preset threshold, to forward the calling number to the matched multi-call forwarding number.

Different from the implementation above, if the calling number matches with the preset multi-call forwarding number, this implementation does not directly forward the calling number to the matched multi-call forwarding number, but judges whether the call duration reaches the preset threshold; if the call duration reaches the preset threshold, the calling number is forwarded to the multi-call forwarding number. In this scheme, the user can answer the call according to requirements, also can select to forward the call; in this way, this implementation can improve the flexibility of the user answering the call, prevent the user from missing any call, meet different requirements of the user and improve the flexibility of call forwarding.

As a third implementation, the call forwarding component 202 is further configured to judge whether a time point, at which the incoming call from the calling number is received, is in a preset multi-call forwarding time range; if the time point is in the preset multi-call forwarding time range, analyze the calling number; if the time point is not in the preset multi-call forwarding time range, reserve the calling number and enter the normal call process.

Different from the implementation above, after the calling number is received, this implementation does not directly perform call forwarding, but judges whether to perform call forwarding, that is, judging whether a time point, at which the incoming call from the calling number is received, is in the preset multi-call forwarding time range; if the time point is in the preset multi-call forwarding time range, analyzing the calling number, forwarding the call or holding the call; if the time point is not in the preset multi-call forwarding time range, holding the calling number and entering the normal call process.

In this implementation, the user can set in advance to perform call forwarding for incoming calling numbers in a specified time period; for example, during vacation, to avoid being interrupted by working phones, the user can forward the specified incoming calling number to the specified call forwarding number. The user also can select part contacts or calling objects to be forwarded.

Through the above scheme, this implementation can improve the flexibility of the user answering the call, meet different requirements of the user and meanwhile improve the flexibility of call forwarding.

Figure 9:
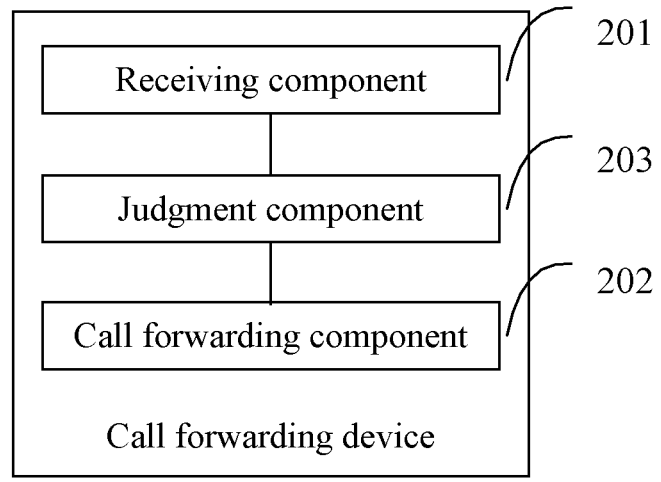
FIG. 9 is a structural schematic diagram of a device for call forwarding according to a second embodiment of the disclosure.

As shown in FIG. 9, another embodiment of the disclosure provides a device for call forwarding, which on the basis of the embodiment shown in FIG. 8 further includes:

a judgment component 203, which is configured to judge whether the multi-call forwarding function is enabled; if the multi-call forwarding function is enabled, the call forwarding component forwards or reserves the calling number according to the preset multi-call forwarding rule; if the multi-call forwarding function is not enabled, the call forwarding component reserves the calling number and enters the normal call process.

Different from the embodiment shown in FIG. 8, this embodiment further includes judging whether the multi-call forwarding function is enabled after an incoming calling number is received.

A user can select to enable or disable the multi-call forwarding function according to requirements.

After the calling number of the incoming call is received, the mobile phone first judge whether the multi-call forwarding function is enabled; if the multi-call forwarding function is enabled, the mobile phone forwards or reserves the calling number according to the preset multi-call forwarding rule; if the multi-call forwarding function is not enabled, the mobile phone reserves the calling number and enters the normal call process, that is, when the multi-call forwarding function is disabled, all received calls are not forwarded.

Once the multi-call forwarding function is enabled, multi-call information is started to be monitored; once a calling number is monitored to match with a preset number or a preset rule, and the time period is totally matched, a multi-call forwarding mark is set and the calling number is forwarded; when the multi-call forwarding function is disabled, monitoring is stopped.

Through the above scheme, this embodiment can improve the flexibility of the user answering the call, meet different requirements of the user and meanwhile improve the flexibility of call forwarding.

In an example embodiment, the judgment component 203 is further configured to disable the multi-call forwarding function. The user can disable the multi-call forwarding function when not using the call forwarding function (for example, after vacation) according to actual conditions, thus convenience is brought to the user.

Figure 10:
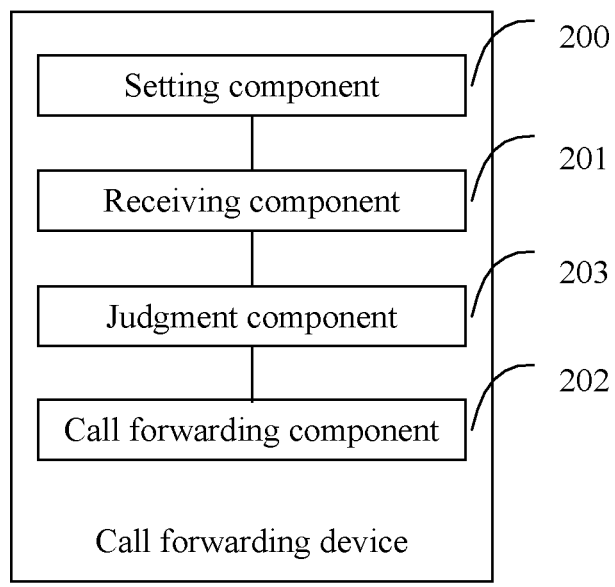
FIG. 10 is a structural schematic diagram of a device for call forwarding according to a third embodiment of the disclosure.

As shown in FIG. 10, a third embodiment of the disclosure provides a device for call forwarding, which on the basis of the embodiment shown in FIG. 9 further includes:

a setting component 200, which is configured to set a multi-call forwarding number for specified and/or non-specified contacts.

Different from the embodiment shown in FIG. 9, this embodiment further includes a scheme of setting a multi-call forwarding number for calling objects When setting the multi-call forwarding number, the user can respectively specify a corresponding call forwarding number for a contact on a mobile phone contact list, or can specify a corresponding call forwarding number for all calling objects. That is to say, the user can set a forwarding function for particular contacts or can set a forwarding function for non-particular contacts, thus the flexibility of the multi-call forwarding number is improved.

Compared with the related art, the embodiment of the disclosure needs no support of operators, and it can implement the multi-call forwarding function with a mobile phone only; all received calls can be forwarded; in addition, an object number to be forwarded can be set in advance, with authentic effect and high flexibility; moreover, a time period needing to be forwarded can be set in advance, with more convenient and reasonable functions.

Through the above scheme, this embodiment provides a call forwarding service for a specified calling object. Specifically, through matching with any preset multi-call forwarding number, multiple calls originally sent to a mobile phone number of the user are forwarded to the corresponding specified number or are reserved. This scheme can set for all types of calling objects whether it is needed to perform call forwarding and set the call forwarding direction, for example, once a call forwarding number is set for a user A on a contact list successfully, then the call from the user A can be forwarded to the specified number; this scheme improves the call forwarding flexibility of mobile terminals such as mobile phone and provides convenience to users.

The above are only the example embodiments of the disclosure and are not intended to limit the patent scope of the disclosure. Any equivalent structures or equivalent flow modifications made according to the description and the accompanying drawings of the disclosure, or any equivalent structures or equivalent flow modifications applied in other relevant technical fields directly or indirectly are intended to be included in the patent protection scope of the disclosure.

INDUSTRIAL APPLICABILITY

To sum up, a method and device for call forwarding provided by the embodiments of the disclosure have benefits as follows: a call forwarding service is provided for a specified calling object; specifically, through matching with any preset multi-call forwarding number, multiple calls originally sent to a mobile phone number of a user are forwarded to a corresponding specified number or are reserved. This scheme can set for all types of calling objects whether it is needed to perform call forwarding and set the call forwarding direction, for example, once a call forwarding number is set for a user A on a contact list successfully, then the call from the user A can be forwarded to the specified number; this scheme improves the call forwarding flexibility of mobile terminals such as mobile phone and provides convenience to users.

What is claimed is:

1. A method for call forwarding, comprising:
    a terminal receiving a calling number of an incoming call;
    the terminal forwarding or holding the calling number according to a preset multi-call forwarding rule;
    wherein after the terminal receives the calling number of the incoming call, the method further comprises: the terminal judging whether a multi-call forwarding function is enabled; when the multi-call forwarding function is enabled, the terminal executing a step of forwarding or holding the calling number according to the preset multi-call forwarding rule; when the multi-call forwarding function is not enabled, the terminal holding the calling number and entering a normal call process;
    wherein the terminal forwarding or holding the calling number according to the preset multi-call forwarding rule comprises: the terminal analyzing the calling number and judging whether the calling number matches with any preset multi-call forwarding number; when the calling number matches with the preset multi-call forwarding number, the terminal forwarding the calling number to the matched multi-call forwarding number;
    wherein before the terminal analyzing the calling number, the method further comprises: the terminal judging whether a time point, at which the incoming call from the calling number is received, is in a preset multi-call forwarding time range; when the time point is in the preset multi-call forwarding time range, the terminal executing the step of analyzing the calling number; when the time point is not in the preset multi-call forwarding time range, the terminal holding the calling number and entering a normal call process.

2. The method as claimed in claim 1, wherein before the terminal forwarding the calling number to the matched multi-call forwarding number, the method further comprises:
    the terminal judging whether a call duration reaches a preset threshold;
    when the call duration reaches the preset threshold, the terminal executing a step of forwarding the calling number to the matched multi-call forwarding number.

3. The method as claimed in claim 1, wherein after the terminal judging whether the calling number matches with the preset multi-call forwarding number, the method further comprises:
    when the calling number does not match with any preset multi-call forwarding number, the terminal forwarding the calling number to a default multi-call forwarding number when a call duration reaches a preset threshold.

4. The method as claimed in claim 1, wherein after the terminal judging whether the calling number matches with the preset multi-call forwarding number, the method further comprises:
    when the calling number does not match with any preset multi-call forwarding number, the terminal holding the calling number and entering a normal call process.

5. The method as claimed in claim 1, further comprising:
    the terminal disabling the multi-call forwarding function.

6. The method as claimed in claim 1, wherein before the terminal receiving the calling number of the incoming call, the method further comprises:
    the terminal setting a multi-call forwarding number for specified and/or non-specified contacts.

7. A device for call forwarding, comprising: a hardware processor coupled with a memory and configured to execute program components stored on the memory, wherein the program components comprise:
    a receiving component, which is configured to receive a calling number of an incoming call;
    a call forwarding component, which is configured to forward or reserve the calling number according to a preset multi-call forwarding rule;
    wherein the program components further comprise: a judgment component, which is configured to judge whether a multi-call forwarding function is enabled; wherein when the multi-call forwarding function is enabled, the call forwarding component is configured to forward or reserve the calling number according to the preset multi-call forwarding rule; when the multi-call forwarding function is not enabled, the call forwarding component is configured to reserve the calling number to enter a normal call process; wherein the call forwarding component is configured to analyze the calling number and to judge whether the calling number matches with any preset multi-call forwarding number, and, when the calling number matches with the preset multi-call forwarding number, to forward the calling number to the matched multi-call forwarding number;
    wherein the call forwarding component is further configured to: judge whether a time point, at which the incoming call from the calling number is received, is in a preset multi-call forwarding time range; when the time point is in the preset multi-call forwarding time range, analyze the calling number; when the time point is not in the preset multi-call forwarding time range, reserve the calling number to enter a normal call process.

8. The device as claimed in claim 7, wherein
    the call forwarding component is further configured to judge whether a call duration reaches a preset threshold, and, when the call duration reaches the preset threshold, to forward the calling number to the matched multi-call forwarding number.

9. The device as claimed in claim 7, wherein
    the call forwarding component is further configured to: when the calling number does not match with the preset multi-call forwarding number, forward the calling number to a default multi-call forwarding number when a call duration reaches a preset threshold, or, when the calling number does not match with the preset multi-call forwarding number, reserve the calling number to enter a normal call process.

10. The device as claimed in claim 7, wherein the judgment component is further configured to disable the multi-call forwarding function.

11. The device as claimed in claim 7, wherein the program components further comprise:
a setting component, which is configured to set a multi-call forwarding number for specified and/or non-specified contacts.

* * * * *